United States Patent
Lee et al.

(10) Patent No.: US 8,446,510 B2
(45) Date of Patent: May 21, 2013

(54) METHOD AND APPARATUS FOR IMPROVING FACE IMAGE IN DIGITAL IMAGE PROCESSOR

(75) Inventors: Seung-yun Lee, Suwon-si (KR); Jae-won Jang, Suwon-si (KR); Inh-seok Suh, Suwon-si (KR); Tae-won Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 12/560,530

(22) Filed: Sep. 16, 2009

(65) Prior Publication Data

US 2010/0097485 A1 Apr. 22, 2010

(30) Foreign Application Priority Data

Oct. 17, 2008 (KR) .................. 10-2008-0102134

(51) Int. Cl.
*H04N 5/222* (2006.01)
(52) U.S. Cl.
USPC .............................. 348/333.12; 348/333.02
(58) Field of Classification Search .............. 348/333.02, 348/333.12
See application file for complete search history.

(56) References Cited

U.S. PATENT DOCUMENTS

| | | | | |
|---|---|---|---|---|
| 6,597,396 | B1 * | 7/2003 | Quendt et al. | 348/223.1 |
| 6,870,529 | B1 * | 3/2005 | Davis | 345/207 |
| 7,068,429 | B1 | 6/2006 | Ori | |
| 7,312,934 | B2 | 12/2007 | Iwasawa | |
| 7,515,352 | B2 | 4/2009 | Arai | |
| 7,990,623 | B2 | 8/2011 | Hatakeyama et al. | |
| 2002/0081003 | A1 * | 6/2002 | Sobol | 382/118 |
| 2004/0042791 | A1 * | 3/2004 | Suekane et al. | 396/661 |
| 2004/0130631 | A1 * | 7/2004 | Suh | 348/222.1 |
| 2004/0170337 | A1 * | 9/2004 | Simon et al. | 382/254 |
| 2010/0026832 | A1 * | 2/2010 | Ciuc et al. | 348/222.1 |

FOREIGN PATENT DOCUMENTS

| | | |
|---|---|---|
| EP | 1 453 002 A2 | 9/2004 |
| GB | 2 372 168 A | 8/2002 |
| GB | 2 429 385 A | 2/2007 |
| JP | 2006-071993 A | 3/2006 |
| JP | 2006-195068 A | 7/2006 |
| JP | 2006-276475 A | 10/2006 |
| JP | 2007-219318 A | 8/2007 |
| WO | WO 00/76398 A1 | 12/2000 |
| WO | WO 2009/036554 A1 | 3/2009 |

* cited by examiner

*Primary Examiner* — Anthony J Daniels
(74) *Attorney, Agent, or Firm* — Drinker Biddle & Reath LLP

(57) ABSTRACT

Provided are a method and apparatus for measuring the skin condition of a face detected from an image and improving the face image. The apparatus for improving a face image in a digital image processor comprises a digital signal processor measuring the skin condition of a face detected from an image, correcting a rough portion of the skin of the detected face according to the measured skin condition and displaying the corrected image.

19 Claims, 6 Drawing Sheets

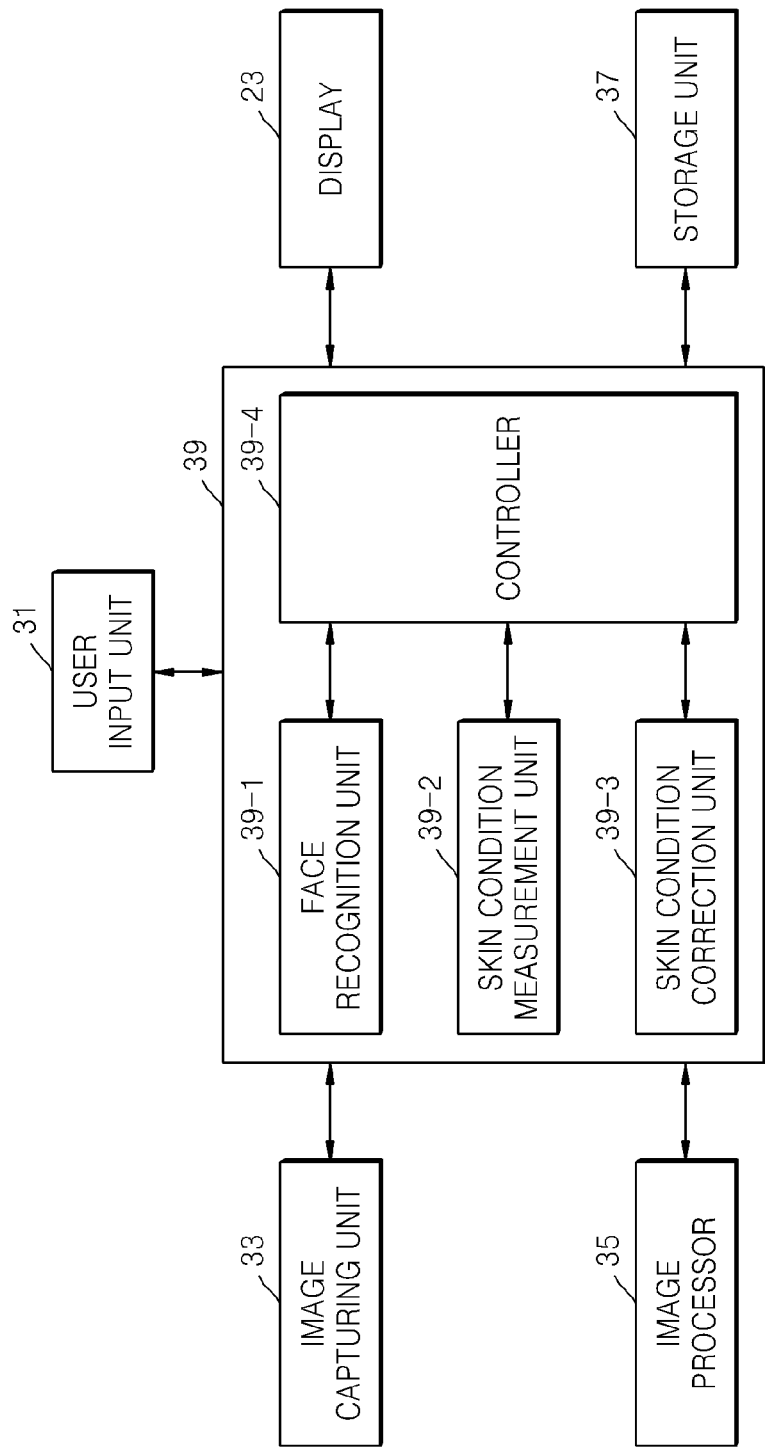

SKIN CONDITION ADJUSTMENT BAR

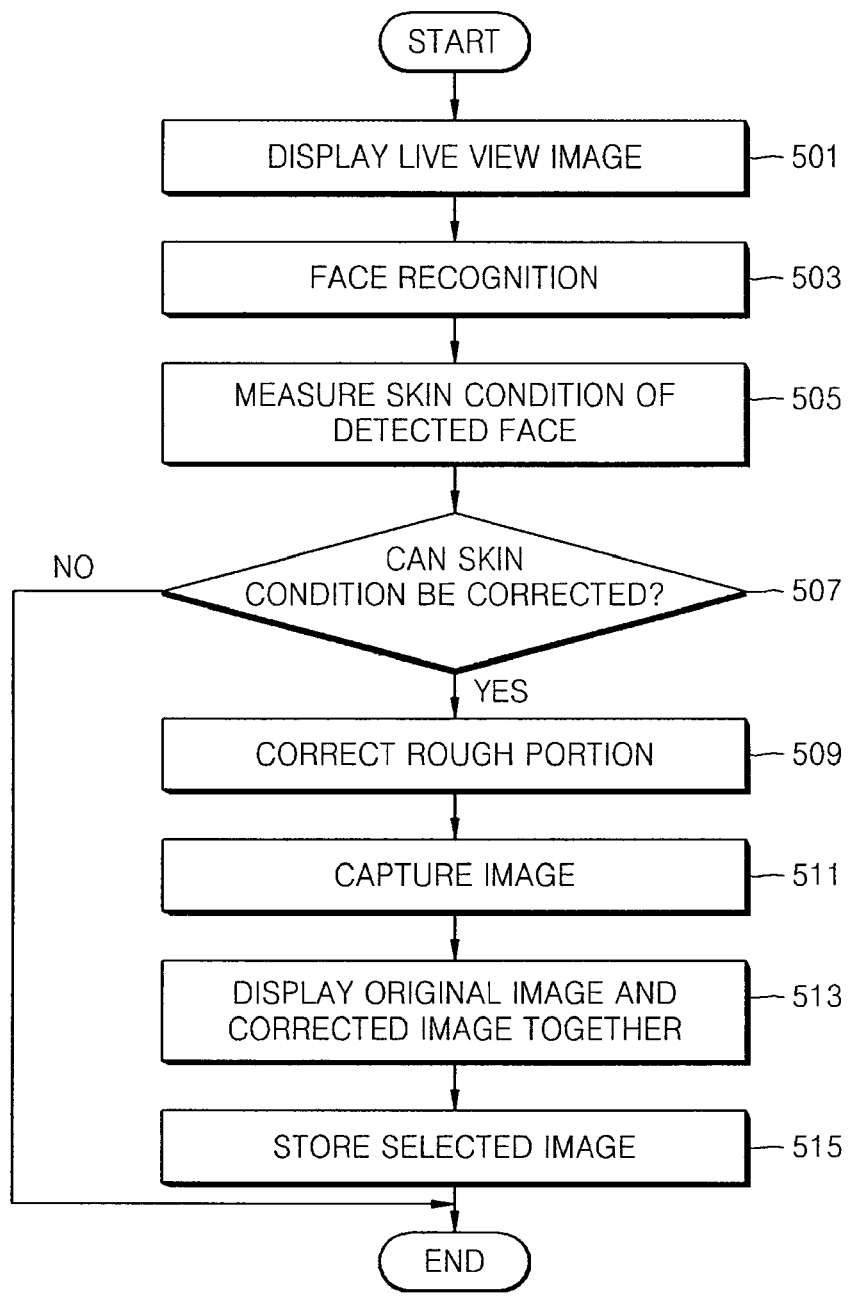

US 8,446,510 B2

METHOD AND APPARATUS FOR IMPROVING FACE IMAGE IN DIGITAL IMAGE PROCESSOR

CROSS-REFERENCE TO RELATED PATENT APPLICATION

This application claims the benefit of Korean Patent Application No. 10-2008-0102134, filed on Oct. 17, 2008 in the Korean Intellectual Property Office, the entire contents of which is incorporated herein in by reference.

BACKGROUND OF THE INVENTION

1. Field of the Invention

The present invention relates to a digital image processing method and apparatus, and more particularly, to a method and an apparatus for measuring the skin condition of a face detected from an image and improving the face image.

2. Description of the Related Art

A digital image processor uses a CCD or MOS image sensor as an image sensor. This image sensor is distinguished from the human eye in that it may record more details than a human eye. The value of the digital image processor may be measured by how satisfied a user is with the images obtained by the digital image processor.

SUMMARY OF THE INVENTION

An apparatus is disclosed for improving a face image in a digital image processor. The apparatus includes a digital signal processor configured to measure the skin condition of a face detected from an image, and to correct a rough portion of the skin of the detected face according to the measured skin condition and to display the corrected image.

The image may correspond to a live view image before being captured.

The digital signal processor may include a face recognition unit configured to perform face recognition on the image to detect the face; a skin condition measurement unit configured to measure the skin condition of the detected face; a skin condition correction unit configured to correct the rough portion of the detected face according to the measured skin condition; and a controller configured to control a correction level according to the measured skin condition and to capture the corrected image.

The controller may be configured to display the skin condition measurement result.

The controller may be configured to receive the correction level from a user.

The controller may be configured to simultaneously display the corrected image and the image before being corrected.

The skin correction unit may be further configured to correct the rough portion by adjusting a gain of the brightness for the rough portion before the controller captures the corrected image.

The skin correction unit may further be configured to correct the rough portion of the detected face based on a stored skin brightness, wherein a value of the stored skin brightness is based on at least adjusting the brightness of one other image.

A method of improving a face image in a digital image processor is disclosed. The method may include performing face recognition on a live view image to detect a face from the live view image; measuring the skin condition of the detected face; correcting a rough portion of the skin of the face according to the measured skin condition; and capturing the image of the face having the corrected skin condition.

The method may include adjusting a level of brightness of the rough portion.

Adjusting further may include adjusting a level of brightness of the rough portion based on a stored brightness for skin correction.

The method may include adjusting a gain level for capturing brightness of the rough portion.

The method may include displaying the measured skin condition after the measuring of the skin condition.

The correcting of the rough portion may include receiving a correction level from a user.

The method may include adjusting a stored brightness for skin correction based on the received correction level from the user; and using the adjusted stored brightness for skin correction to adjust the brightness of another image.

Capturing of the image may include simultaneously displaying the image of the face having the corrected skin condition and the image before corrected and capturing at least one of the two images.

A method for improving a face image in a digital signal processor is disclosed. The method may include performing face recognition on a selected image to detect a face from the reproduced image; measuring the skin condition of the detected face; correcting a rough portion of the skin of the detected face according to the measured skin condition; and re-storing the selected image of the face having the corrected skin condition.

The method may include displaying the measured skin condition after the measuring of the skin condition.

Correcting of the rough portion may include receiving a correction level from a user.

The re-storing of the image may include simultaneously displaying the selected image of the face having the corrected skin condition and the selected image before being corrected and re-storing at least one of the two images.

BRIEF DESCRIPTION OF THE DRAWINGS

The above and other features and advantages of the present disclosure will become more apparent by describing in detail exemplary embodiments thereof with reference to the attached drawings in which:

FIG. 3 is a block diagram of an example of an apparatus for improving a face image in a digital image processor, according to an embodiment of the present invention;

FIG. 5 is a flowchart illustrating operations of an example of a method of improving a face image in a digital image processor, according to an embodiment of the present invention.

DETAILED DESCRIPTION OF THE INVENTION

Therefore there is a need in the art for an apparatus for improving a face image in a digital image processor. The apparatus including a digital signal processor configured to measure the skin condition of a face detected from an image, and to correct a rough portion of the skin of the detected face according to the measured skin condition and to display the corrected image.

The present disclosure will be described in detail by exemplary embodiments with reference to the attached drawings.

Figure 1:
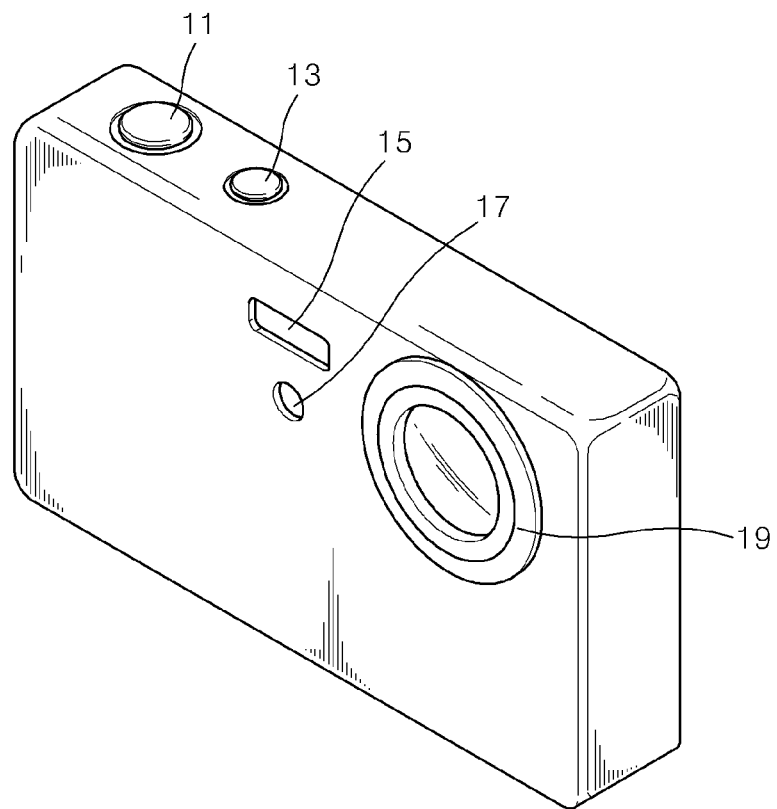
FIG. 1 is a perspective view illustrating the front and top faces of an example of a digital image processor.

FIG. 1 is a perspective view illustrating the front and top faces of an example of a digital image processor. Referring to FIG. 1, a shutter-release button 11 is pressed and released to expose a charge-coupled device (CCD) to light for a predetermined time and operates in connection with an iris (not shown) to appropriately expose an object and record an image of the object in the CCD.

The shutter-release button 11 generates first and second image capturing signals according to a user's input. When a first shutter-release signal as a half-shutter signal is input through the shutter-release button 11, the digital image processor focuses an object and controls the quantity of light. When the object is in focus, a green light illuminates on a display 23 illustrated in FIG. 2. After the shutter-release button 11 is pressed to adjust the focus and control the quantity of light, a second shutter-release signal as a complete shutter signal is input through the shutter-release button 11 to take a picture of the object.

A power button 13 is pressed to supply power to the digital image processor so as to operate the digital image processor.

A flash 15 flashes an object in a dark place and operates in a flash mode including automatic flash, forced lighting, light emission inhibition, red-eye reduction and slow synchro.

An auxiliary light 17 illuminates an object in case of insufficient light or night photographing such that the digital image processor can perform auto-focus rapidly and accurately.

The lens 19 optically processes light reflected from an object.

Figure 2:
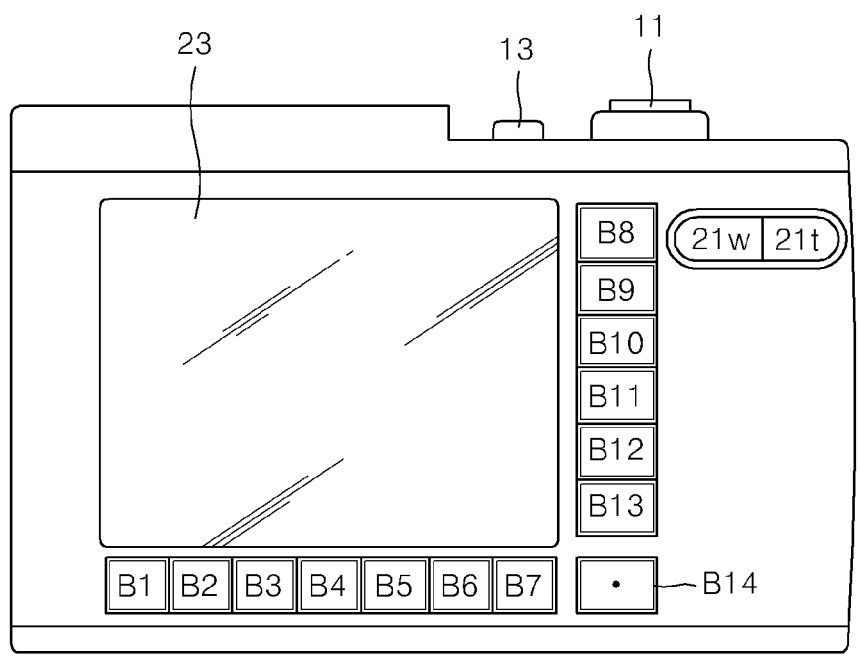
FIG. 2 is an example of a rear view of the digital image processor illustrated in FIG. 1.

FIG. 2 is an example of a rear view of the digital image processor illustrated in FIG. 1. Referring to FIG. 2, the digital image processor includes a wide-angle zoom button 21w, a telephoto-zoom button 21t, the display 23 and input buttons B1 through B14 having touch sensors or contact switches.

The wide-angle zoom button 21w or the telephoto-zoom button 21t is pressed to widen or narrow a view angle. Particularly, the wide-angle zoom button 21w or the telephoto-zoom button 21t is pressed when the size of a selected exposure region is to be changed. The size of the selected exposure region decreases when the wide-angle zoom button 21w is pressed and increases when the telephoto-zoom button 21t is pressed.

The buttons B1 through B14 are arranged at the bottom and a side of the display 23 and may include touch sensors or contact switches. The horizontal buttons B1 through B7 arranged at the bottom of the display 23 or the vertical buttons B8 through B14 arranged at the side of the display 23 can be touched and moved in vertical and horizontal directions to select a menu item (for example, color or brightness) or activate a lower menu icon included in a main menu icon when the buttons B1 through B7 or the buttons B8 through B14 include the touch sensors.

Furthermore, the buttons B1 through B14 may include contact switches to directly select the main menu icon and a lower menu icon to execute functions corresponding to the main menu icon and the low menu icon. A touch sensor requires touch weaker than touch applied to a contact switch.

FIG. 3 is a block diagram of an example of an apparatus for improving a face image in a digital image processor. Referring to FIG. 3, the apparatus for improving a face image includes the display 23, a user input unit 31, an image capturing unit 33, an image processor 35, a storage unit 37 and a digital signal processor 39.

The user input unit 31 includes the shutter-release button 11 that can be pressed and released to expose the CCD to light for a predetermined time, the power button 13 for providing power to the apparatus, the wide-angle zoom button 21w and the telephoto-zoom button 21t for widening or narrowing a view angle, and the buttons B1 through B14 having touch sensors or contact switches, and arranged at the bottom and side of the display 23 in vertical and horizontal directions.

The image capturing unit 33 includes a shutter (not shown), a lens (not shown), an iris (not shown), a CCD, and an analog-to-digital converter (ADC). The shutter adjusts the quantity of exposure light, together with the iris. The lens receives light from an external light source and processes images. The iris adjusts the quantity of light (light intensity) according to a degree to which the iris is opened or closed, as controlled by the digital signal processor 39.

The CCD accumulates light received through the lens and outputs an image captured by the lens in synchronization with a vertical synchronization signal according to the accumulated light. The digital image processor acquires an image of an object according to the CCD that converts light reflected from the object into an electric signal. The digital image processor requires a color filter to obtain a color image using the CCD and generally employs a color filter array (CFA) (not shown). The CFA includes regularly arranged pixels each of which transmits light in one color and has various forms according to a pixel arrangement structure. The ADC converts an analog signal output from the CCD into a digital signal.

In embodiments, the image processor 35 processes digital raw data such that the data can be displayed. The image processor 35 removes a level of a dark current generated in the CCD and the CFA that is sensitive to temperature. The image processor 35 performs gamma correction that encodes information according to non-linearity of human sight. In addition, the image processor 35 performs CFA interpolation that interpolates a Bayer pattern composed of a RGRG line and a GBGB line of predetermined gamma-corrected data into RGB lines. Furthermore, the image processor 35 converts interpolated RGB signals into YUV signals, filters a Y signal using a high pass filter to make the image corresponding to the Y signal distinct, corrects color values of the U and V signals using a standard color coordinate system and removes noise from the YUV signals. The image processor 35 compresses and processes the noise-removed YUV signals to generate a JPEG file. The generated JPEG file is displayed on the display 23 and stored in the storage unit 37. The operation of the image processor 35 is performed under the control of the digital signal processor 39.

The digital signal processor 39 measures the skin condition of a face recognized from a live view image before being captured or an image stored after being captured and corrects a rough portion of the skin (freckles, spots, wrinkles and so on) according to the measured skin condition. In embodiments, to perform these operations, the digital signal processor 39 includes a face recognition unit 39-1, a skin condition measurement unit 39-2, a skin condition correction unit 39-3 and a controller 39-4.

The face recognition unit 39-1 detects a face from a live view image to be captured under the control of the controller 39-4 or an arbitrarily reproduced image. An example of how a face may be recognized is that the face recognition unit 39-1 detects unvarying features of a face (the eyes, the nose, the mouth, skin color and texture) through a facial features-based face detection. A skin color, among various face features, is less sensitive to moving and rotating of a face and a variation in the size of the face, and thus the skin color is most frequently used for face detection. In embodiments, the face recognition unit 39-1 creates several standard patterns with respect to a face and stores the standard patterns through face template-based detection. The standard patterns are compared to an image one by one to detect a face from the image. Support vector machine (SVM)-based face detection methods are widely used as a face detection method. Thus, the SVM based-face detection methods sub-sample different regions from an image, learns a face and a portion other than the face and detects a face from an input image.

Figure 4A:
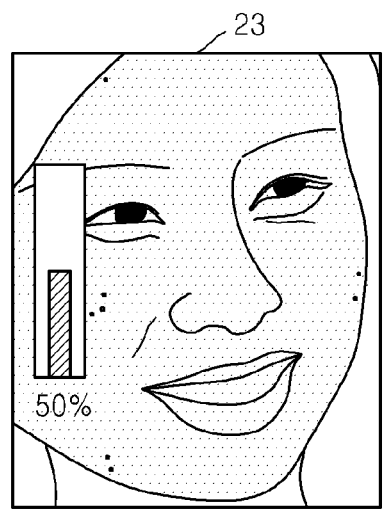
FIGS. 4A through 4E illustrate examples of skin condition measurement results, an example of an image before being corrected and an example of a corrected image, obtained by the digital image processor illustrated in FIG. 3.

The skin condition measurement unit 39-2 measures the skin condition of the face detected by the face recognition unit 39-1 under the control of the controller 39-4. The skin condition measurement unit 39-2 can acquire information on a distribution of a rough portion of the detected face, that is, a rough portion of the face including freckles, spots, wrinkles or the like, and display the texture of the skin on the display 23, as illustrated in the example of FIG. 4A. An example of how the condition of the skin can be calculated is that the skin condition measurement unit 39-2 calculates an average brightness of the face detected by the face recognition unit 39-1. The skin condition measurement unit 39-2 divides the detected face into a predetermined number of blocks and calculates the brightness of each of the blocks. Here, the levels of brightness of the blocks including the rough portion, that is, freckles, spots and wrinkles, are lower than the average brightness.

The skin condition corrector 39-3 corrects the rough portion of the skin, as measured by the skin condition measurement unit 39-2. An example of how the skin in the image can be corrected is that since the levels of the brightness of the blocks including the rough portion are lower than the average brightness, the skin condition corrector 39-3 can convert the levels of the brightness of the blocks including the rough portion to the average brightness to thus correct the rough portion. The skin condition corrector 39-3 stores at least one reference brightness for skin condition correction, which is calculated through repeated learning.

The controller 39-4 controls a correction level of the rough portion, which is adjusted by the skin condition corrector 39-3, according to the skin condition measured by the skin condition measurement unit 39-2 and captures or stores the image having the corrected rough portion.

Figure 4B:
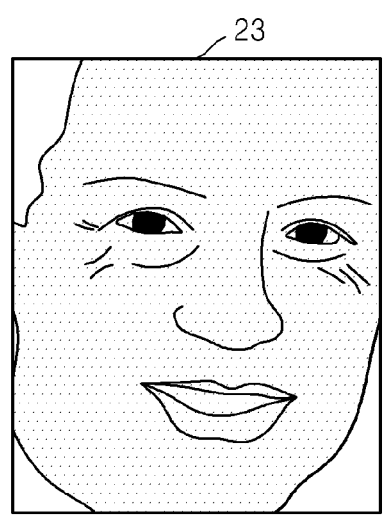
Figure 4C:
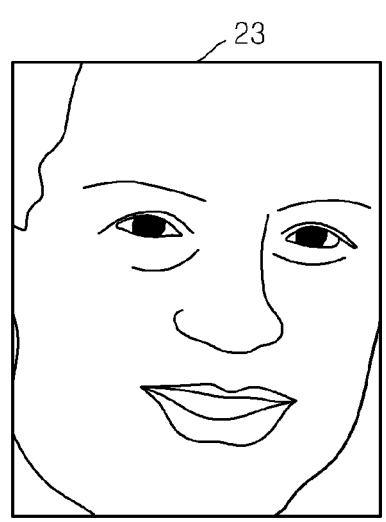
Figure 4D:
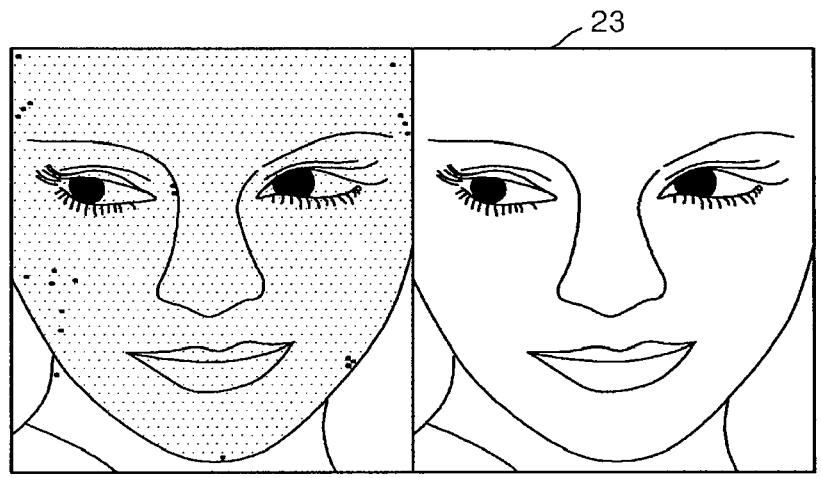

FIG. 4B illustrates an example of an image before the skin condition is corrected and FIG. 4C illustrates an example of an image having a corrected rough portion. The image before the skin condition is corrected and the corrected image can be respectively displayed as illustrated in FIGS. 4B and 4C or simultaneously displayed as a single image as illustrated in the example of FIG. 4D under the control of the controller 39-4.

Figure 4E:
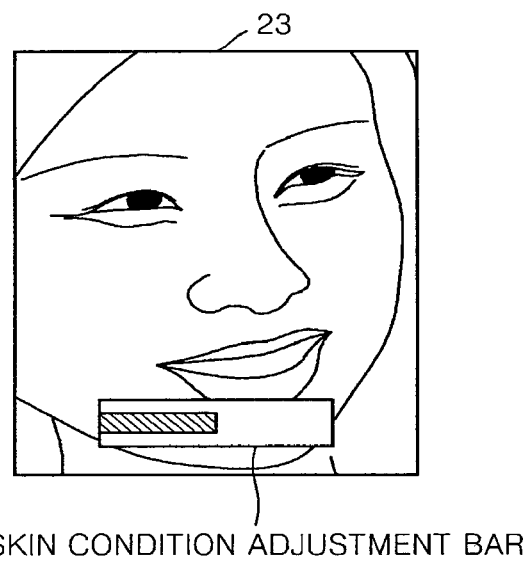

In embodiments, the controller 39-4 can receive the correction level from a user. FIG. 4E illustrates an image on which a skin condition adjustment bar is displayed. The user can select a desired correction level using the skin condition adjustment bar. The controller 39-4 can control the skin condition corrector 39-3 according to the correction level received from the user to correct the skin condition such that the skin condition satisfies a user's demand.

As described above, the skin condition of a face detected from an image can be measured when the image is captured or after the image is captured and corrected to produce an image that may be more satisfying to a user.

Figure 6:
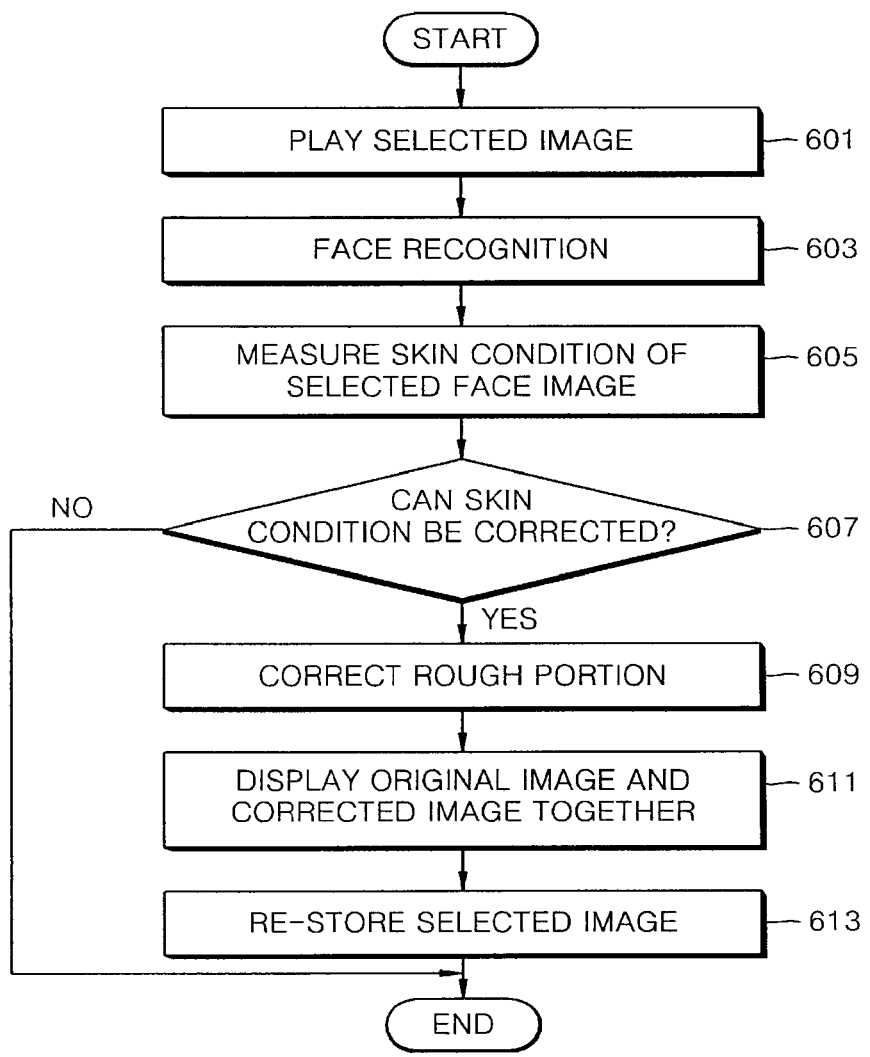
FIG. 6 is a flowchart illustrating operations of an example of a method of improving a face image in a digital image processor, according to another embodiment of the present invention.

An example of a method of improving a face image in a digital image processor will now be explained with reference to FIGS. 5 and 6. The method of improving a face image can be performed by the digital image processor illustrated in FIG. 3 and a main algorithm of the method can be executed in the digital signal processor 39 illustrated in FIG. 3 with the assistance of other components of the digital image processor.

A method of improving a face image in a digital image processor, according to an embodiment of the present invention, will now be explained with reference to FIGS. 3 and 5. The method of improving a face image, illustrated in FIG. 5, is applied when an image is captured.

The digital signal processor 39 displays a live view image on the display 23, in operation 501, and performs face recognition on the live view image, in operation 503. The digital signal processor 39 can perform face recognition using a feature-based face detection method that detects unvarying features of a face (the eyes, the nose, the mouth, skin color and texture). The digital signal processor 39 can use a face template-based detection method or an SVM-based face detection method to detect a face. Other face detection techniques may be used.

When a face is detected from the live view image, the digital signal processor 39 measures the skin condition of the detected face, in operation 505. The digital signal processor 39 can calculate the distribution of a rough portion, that is, freckles, spots and wrinkles, of the detected face and display a texture level of the skin condition on the display 23, as illustrated in FIG. 4A. The digital signal processor 39 calculates an average brightness of the detected face. The digital signal processor 39 divides the detected face into a predetermined number of blocks and calculates the brightness of each block. Here, the levels of brightness of the blocks including the rough portion, that is, freckles, spots and wrinkles, are lower than the average brightness.

The digital signal processor 39 determines whether the skin condition can be corrected, in operation 507, and corrects the rough portion of the detected face, in operation 509, when it is determined that the skin condition can be corrected. Since the levels of the brightness of the blocks including the rough portion are lower than the average brightness, the digital signal processor 39 can change the levels of the brightness of the blocks including the rough portion to the average brightness so as to correct the rough portion. In embodiments, the digital signal processor 39 stores at least one reference brightness for skin correction, which is calculated through repeated learning, and thus, the digital signal processor 39 can convert the levels of the brightness of the blocks including the rough portion to the reference brightness so as to correct the rough portion of the face.

After completion of the correction of the rough portion of the face, the digital signal processor 39 captures the live view image having the corrected skin condition when a user presses the shutter-release button 11 illustrated in FIG. 1, in operation 511.

Then, the digital signal processor 39 simultaneously displays the original image, that is, the image before corrected, and the corrected image in operation 513. FIG. 4B illustrates the live view image before skin correction and FIG. 4C illustrates the skin-corrected live view image. The live view image before corrected and the live view image after corrected can be respectively displayed as illustrated in FIGS. 4B and 4C or simultaneously displayed as a single image as illustrated in FIG. 4D.

The user selects a desired image and the digital signal processor 39 stores the image selected by the user, that is, the image before corrected and/or the corrected image, in operation 515.

An example of a method of improving a face image in a digital image processor according to another embodiment of the present invention will now be explained with reference to FIGS. 3 and 6. The method of improving a face image, illustrated in FIG. 6, is applied when a stored image is displayed.

The digital signal processor 39 reproduces an image selected from images stored in the storage unit 37, in operation 601. The digital signal processor 39 performs face recognition on the reproduced image, in operation 603, when the reproduced image is displayed. The digital signal processor 39 can perform face recognition using a feature-based face detection method that detects unvarying features of a face (the eyes, the nose, the mouth, skin color and texture). The digital signal processor 39 can use a face template-based detection method or an SVM-based face detection method to detect a face. Other face detection techniques may be used.

When a face is detected from the played image, the digital signal processor 39 measures the skin condition of the detected face, in operation 605. The digital signal processor 39 can calculate the distribution of a rough portion, that is, freckles, spots and wrinkles, of the detected face and display the texture level of the skin condition on the display 23, as illustrated in FIG. 4A. The digital signal processor 39 calculates the average brightness of the detected face. The digital signal processor 39 divides the detected face into a predetermined number of blocks and calculates the brightness of each block. Here, the levels of the brightness of the blocks including the rough portion, that is, freckles, spots and wrinkles, are lower than the average brightness.

The digital signal processor 39 determines whether the skin condition can be corrected, in operation 607, and corrects the rough portion of the detected face, in operation 609, when it is determined that the skin condition is corrected. Since the levels of the brightness of the blocks including the rough portion are lower than the average brightness, the digital signal processor 39 can change the levels of the brightness of the blocks including the rough portion to the average brightness so as to correct the rough portion. In embodiments, the digital signal processor 39 stores at least one reference brightness for skin correction, which is calculated through repeated learning, and thus, the digital signal processor 39 can convert the levels of the brightness of the blocks including the rough portion to the reference brightness so as to correct the rough portion of the face.

After completion of the correction of the rough portion of the face, the digital signal processor 39 simultaneously displays the original image, that is, the image before being corrected, and the corrected image, in operation 611. FIG. 4B illustrates an example of the live view image before skin correction and FIG. 4C illustrates an example of the skin-corrected live view image. The live view image before corrected and the live view image after corrected can be respectively displayed as illustrated in FIGS. 4B and 4C or simultaneously displayed as a single image as illustrated in FIG. 4D.

The user selects a desired image and the digital signal processor 39 stores the image selected by the user, that is, the image before corrected and/or the corrected image, in operation 613.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for improving a face image in a digital image processor that uses an image sensor to capture an image from incident light, comprising:
   a digital signal processor comprising:
   a face recognition unit configured to perform face recognition on the image to detect the face;
   a skin condition measurement unit configured to measure the skin condition of the detected face, acquire information on a distribution of the rough portion on the detected face, and display a texture of the skin of the detected face;
   a skin condition correction unit configured to correct the rough portion of the detected face according to the measured skin condition, store at least one reference brightness for skin condition correction, which is calculated through repeated learning, and convert levels of the brightness of the rough portion of the detected face to the stored at least one reference brightness; and
   a controller configured to control a correction level according to the measured skin condition and to capture the corrected image.

2. The apparatus of claim 1, wherein the image corresponds to one of: a live view image before being captured or an image stored after captured.

3. The apparatus of claim 1, wherein the controller is configured to display the skin condition measurement result.

4. The apparatus of claim 1, wherein the controller is configured to receive the correction level from a user.

5. The apparatus of claim 1, wherein the controller is configured to simultaneously display the corrected image and the image before being corrected.

6. The apparatus of claim 1, wherein the skin condition correction unit is further configured to correct the rough portion by adjusting a gain of the brightness for the rough portion before the controller captures the corrected image.

7. The apparatus of claim 1, wherein the skin condition correction unit is further configured to correct the rough portion of the detected face based on a stored skin brightness, wherein a value of the stored skin brightness is based on at least adjusting the brightness of one other image.

8. A method of improving a face image in a digital image processor that uses an image sensor to capture an image from incident light, comprising:
    performing face recognition on a live view image to detect a face from the live view image;
    measuring the skin condition of the detected face;
    determining whether the skin condition can be corrected;
    if the skin condition can be corrected, correcting the rough portion of the skin of the face according to the measured skin condition using the digital image processor, wherein the digital image processor converts levels of the brightness of the rough portion of the skin to at least one reference brightness for skin condition correction, which is calculated through repeated learning; and
    capturing the image of the face having the corrected skin condition.

9. The method of claim 8, further comprising:
    adjusting a level of brightness of the rough portion.

10. The method of claim 8, wherein adjusting further comprises:
    adjusting a level of brightness of the rough portion based on a stored brightness for skin correction.

11. The method of claim 8, further comprising:
    adjusting a gain level for capturing brightness of the rough portion.

12. The method of claim 8, further comprising displaying the measured skin condition after the measuring of the skin condition.

13. The method of claim 8, wherein the correcting of the rough portion comprises receiving a correction level from a user.

14. The method of claim 8, further comprising:
    adjusting a stored brightness for skin correction based on the received correction level from the user; and
    using the adjusted stored brightness for skin correction to adjust the brightness of another image.

15. The method of claim 8, wherein the capturing of the image comprises simultaneously displaying the image of the face having the corrected skin condition and the image before corrected and capturing at least one of the two images.

16. A method for improving a face image in a digital signal processor that uses an image sensor to capture an image from incident light, comprising:
    performing face recognition on a selected image to detect a face from the selected image;
    measuring the skin condition of the detected face by dividing the detected face into a predetermined number of blocks and calculating the brightness of each of the blocks to calculate an average brightness of the detected face;
    determining whether the skin condition can be corrected;
    if the skin condition can be corrected, correcting the rough portion of the skin of the detected face according to the measured skin condition using the digital signal processor, wherein the rough portion has a lower brightness than the average brightness of the detected face, and wherein the digital image processor converts levels of the brightness of the rough portion of the skin to at least one reference brightness for skin condition correction, which is calculated through repeated learning; and
    re-storing the selected image of the face having the corrected skin condition.

17. The method of claim 16, further comprising displaying the measured skin condition after the measuring of the skin condition.

18. The method of claim 16, wherein the correcting of the rough portion comprises receiving a correction level from a user.

19. The method of claim 16, wherein the re-storing of the image comprises simultaneously displaying the selected image of the face having the corrected skin condition and the selected image before being corrected and re-storing at least one of the two images.

* * * * *